US006401075B1

(12) United States Patent
Mason et al.

(10) Patent No.: US 6,401,075 B1
(45) Date of Patent: Jun. 4, 2002

(54) METHODS OF PLACING, PURCHASING AND MONITORING INTERNET ADVERTISING

(75) Inventors: James C. Mason, Muttontown; John Grant, East Hampton, both of NY (US); Arnold Behrman, Marlborough, NJ (US); Dennis Stillwell, New York, NY (US)

(73) Assignee: Global Network, Inc., New York, NY (US)

( * ) Notice: Subject to any disclaimer, the term of this patent is extended or adjusted under 35 U.S.C. 154(b) by 0 days.

(21) Appl. No.: 09/503,275

(22) Filed: Feb. 14, 2000

(51) Int. Cl.[7] ............................................... G06F 17/60
(52) U.S. Cl. .................. 705/14; 707/501.1; 707/513; 707/523; 707/524; 345/760; 345/788; 345/789; 705/1
(58) Field of Search .............................. 705/1, 10, 14; 709/219; 707/501.1, 513, 523, 524; 345/760, 788, 789

(56) References Cited

U.S. PATENT DOCUMENTS

| 5,642,484 A | * | 6/1997 | Harrison, III et al. | ......... 705/14 |
| 5,819,092 A | * | 10/1998 | Ferguson et al. | .............. 717/1 |
| 6,029,141 A | * | 2/2000 | Bezos et al. | ................... 705/27 |
| 6,073,105 A | * | 6/2000 | Sutcliffe et al. | ............... 705/1 |
| 6,314,457 B1 | * | 11/2001 | Schena et al. | .............. 709/219 |

FOREIGN PATENT DOCUMENTS

| WO | WO 00/28438 | * | 5/2000 | .................. 705/14 |
| WO | WO 01/61562 | * | 8/2001 | .................. 705/14 |

OTHER PUBLICATIONS

Business Information in Cyberspace by Jim Heid; MacWorld; Mar. 1995.*
Desktop Tools for Online by T.A. Martin; Editor & Publisher; Apr. 8, 1995.*
US 2001/0001854; Schena et al.; May 2001.*

* cited by examiner

Primary Examiner—Stephen Gravini
(74) Attorney, Agent, or Firm—Galgano & Burke

(57) ABSTRACT

Methods for obtaining Internet-type advertisements, modifying those advertisements to fit designated advertising spaces allotted by a plurality of different and unrelated online newspaper websites, and automatically placing those advertisements. Preferred embodiments permit online advertisements to be tracked, audited and/or modified, at any time during an advertising campaign.

26 Claims, 1 Drawing Sheet

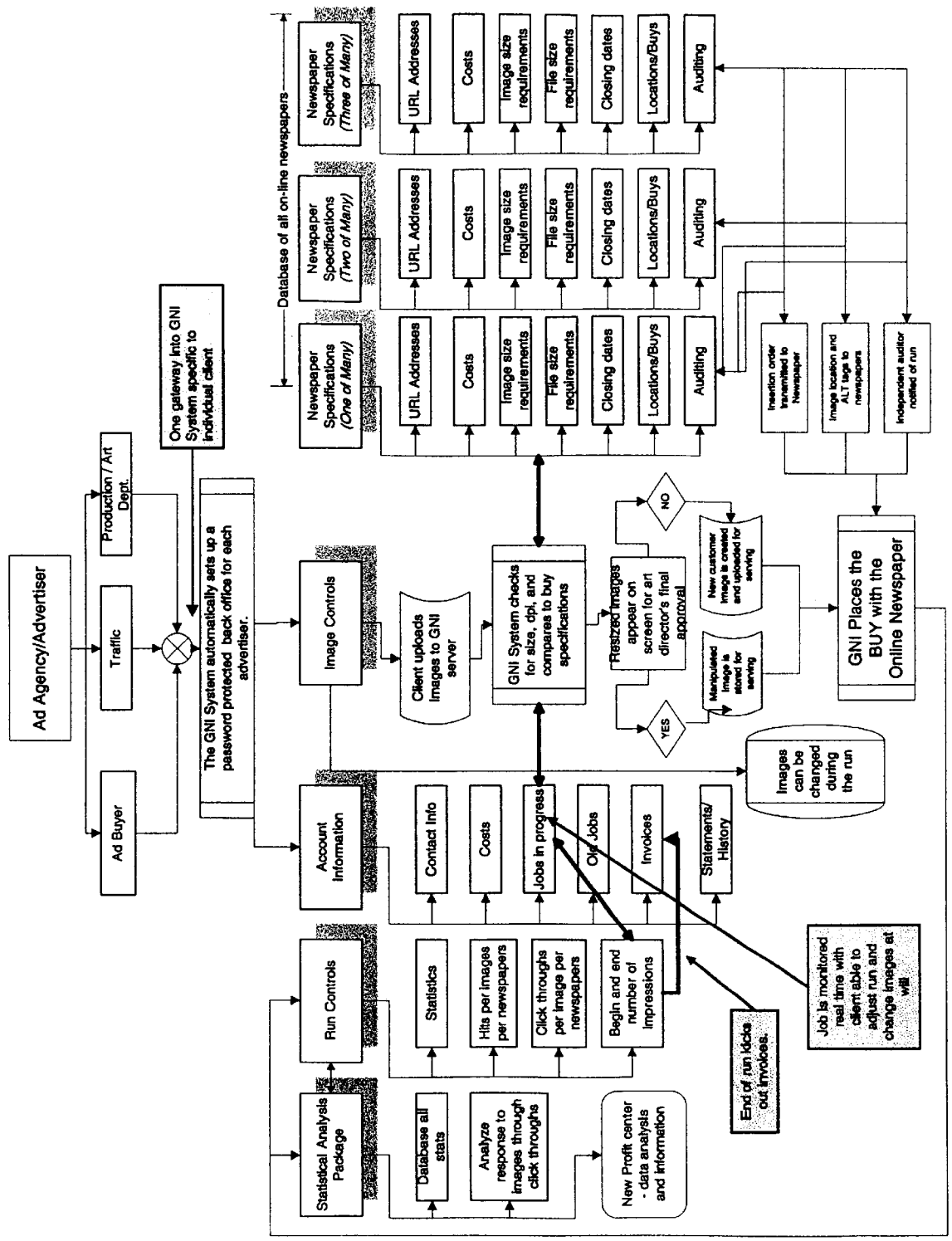

METHODS OF PLACING, PURCHASING AND MONITORING INTERNET ADVERTISING

The present invention is related to methods of placing advertisements and/or other communications on multiple websites and is particularly useful for advertising on the websites of newspapers.

BACKGROUND

National advertisers, such as national companies offering financial services, packaged goods, entertainment, pharmaceuticals, health care products, automobiles, as well as other groups wishing to perform national promotions such as political parties, have very labor intensive requirements if they wish to advertise on the websites of local newspapers. Presently, if a national advertiser wishes to conduct a local advertising campaign using the websites of local newspapers, the company or its advertising agency would have to deal directly with each local newspaper since different papers have different advertising rates, different size advertising space available, different technical specifications, and different sections. For example, different newspapers around the country may or may not have business sections, sports sections, weather pages, classified sections, local news sections, national news sections, entertainment sections and/or various other sections covering such topics such food, fashion, health, politics, weekend, parenting, teens, etc. Furthermore, there are format variations within each section, for example, some business sections may offer only one html (electronic page) while others may offer six, seven or more including: personal finance, mortgage rates, retirement planning, funding education, mutual funds, stocks, savings/CD rates, etc. Such different sections are typically displayed on different URLs, i.e., web pages, on the newspaper's website. Therefore, if a national soup company decides to place advertisements on the web pages of 20 different newspapers which show local weather, that soup company or its agent would typically be required to contact each of those newspapers and determine the process and parameters for placing an ad. Then, since different newspapers would most likely have different spacing and size requirements for their available advertising space as, as well as different pricing plans and different closing dates for the purchase of online advertising space, each ad placement would have to be negotiated and separate ads would have to be configured to fit the sizes of the different sites. In addition to rates and sizing of the ads, in dealing on an individual basis, national advertisers must typically obtain every URL on the newspaper site and must alert servers to track each of these URLs. Auditors must also be alerted to the specific URLs being used on each newspaper, and the newspaper's interactive staff must be monitored on a twenty-four hour per day and seven day per week basis. Individual, electronic insertion orders must be sent out with specific instructions and a follow up to each newspaper must be made to each to ensure its receipt by each newspaper.

In light of the substantial effort required for each local newspaper website, national advertisers typically avoid advertising on the websites of local newspapers. Thus, the inventors of the present systems believe there is a need for a more efficient method for national advertisers to purchase, place, monitor and modify advertisements on the websites of local newspapers.

Additionally, the present inventors believe that online newspaper websites are selling significantly less than all of their available advertising space inventory. Therefore, there is a need for methods to facilitate the sale of a greater percentage of online newspapers' advertising space.

SUMMARY OF THE INVENTION

Various embodiments of the present invention are directed to methods for obtaining Internet-type advertisements, modifying those advertisements to fit the designated advertising spaces allotted by a plurality of different and unrelated online newspaper websites, automatically placing those advertisements, monitoring the success of the placed ads and modifying the ads and their placements to meet dynamic goals of an advertising campaign.

Preferred embodiments of the present invention additionally provide methods which permit online advertisements to be tracked, audited and/or modified, at any time midstream during a specific placement.

The various embodiments of the present invention are particularly advantageous to national advertisers and their advertising agencies which, utilizing one or more of the methods of the present invention, can obtain multiple online newspaper website advertisements utilizing a single order entry.

Embodiments of the present invention provide turnkey solutions that allow major advertisers to buy advertising in local markets, such as Long Island Newsday, the Boston Globe, the Washington Post, the Los Angeles Times, etc. Embodiments of the present invention enable an advertiser to target newspapers geographically.

Online newspaper websites are different from some other websites since, other than the ads which are the subject of the present invention, are typically 100% content sites and also typically comprise multiple URLs and web pages which offer various marketers editorial or content which is complementary to their advertising message. For example, an advertiser of financial services can place ads on financial URLs, while an automobile advertiser could be placed on auto URLs, etc.

Embodiments of the present invention enable a national advertiser to target newspapers geographically through a domain name, identify specific URLs and web pages therein, direct the placement of the electronic impression on the web page, monitor and control the volume of traffic in terms of both web page views and visits, i.e., click-throughs, as well as to audit and determine accurate billing. Due to the size and complicated nature of online newspaper websites, they can sometimes change hourly. Embodiments of the present invention can track all of these parameters and make necessary changes in order to provide the advertiser with total accuracy in evaluating the success of an advertising campaign during the life of the campaign.

Embodiments of the present invention are particularly suited to online newspaper websites in that the advertiser may require an electronic impression on a specific section for a pre-determined period of time in order to attract traffic. Embodiments of the present invention enable an advertiser or an intermediary to electronically purchase multiple online advertising spaces, specific URLs, and to order, audit, configure ads to fit specific sizes, closing dates, locations on a web page, frequency of rotation, file size (Kb), image dimensions and auditing systems of the different sites.

These and other aspects of the present invention are described in further detail below.

BRIEF DESCRIPTION OF THE DRAWING

FIG. 1 is a block diagram illustrating one method of the present invention.

DETAILED DESCRIPTION

Various embodiments of the present invention are directed to methods of purchasing, placing, monitoring and/or modifying advertisements on online websites, and is particularly adapted for online newspaper websites. Unless specifically noted, the present invention is not limited to use with online newspaper websites, however, since the various embodiments of the present invention are particularly suited for use with online newspaper websites, the invention will be described with reference to online newspaper websites.

According to one embodiment of the present invention, one or more central processors are provided with information regarding the parameters of a plurality of advertising spaces on unrelated online websites. For example, the parameters of 20 different local newspapers and the parameters for one or more of the available advertising spaces on their websites are input into the memory of a computing device, e.g., a CPU. Those skilled in the art will appreciate that the Washington Post website may have online advertising spaces having many different configurations on different URLs. At least one, and preferably a plurality of original advertisements are obtained and also input into a computing device.

In accordance with this method of the present invention, when an original advertisement is loaded into a central processor, for example, by downloading the original advertisement off a website of the company wishing to place the advertisement (the advertiser), that original advertisement is used to form derivative advertisements which conform to the configuration parameters of a plurality of selected online newspaper websites and/or URLs. The properly configured derivative advertisements are then transmitted to the desired online newspaper websites or the web masters for those websites for display on those websites as derivative advertisement links. According to one preferred aspect of the present invention, before the derivative advertisements are transmitted to the online newspaper websites or web masters of those sites, they are displayed on a computer screen of at least one person responsible for the quality of those derivative ads. For example, they can be displayed on the screen of an art director of the advertiser or that advertiser's advertising agency, or wherever else desired.

The derivative placement advertisements of the present invention are electronic images which can take many forms such as fixed or streaming banners, interstitial ads, tile ads or micro-cites. Those skilled in the art will appreciate that banner ads can be placed on any portion of a website and are most typically configured to 140 by 800 pixels, 86 by 60 pixels, 468 by 68 pixels, 184 by 90 pixels, 125 by 125 pixels and 234 by 60 pixels. The present invention however is not limited to any particular size or format of ads. Interstitial ads are ads which pop up on a screen and require the viewer to close the interstitial ad before proceeding. Tile ads are ads which extend down a column vertically. Micro-cites are typically small, square ads, most often located on the lower lefthand corner of a web page.

Once displayed on a website, the derivative ads are actually derivative ad links since a person viewing the derivative ad links can click on these links in order to be connected to a website established by the national advertiser. For example, upon clicking upon a derivative ad link for a national soup company, a potential customer may be connected with the home page of that soup company or to some other website specifically designed for use in connection with that advertising campaign.

While various embodiments of the present invention have the ability for re-configuring an original ad, many advantages of the present invention can be utilized with an ad which has not been reconfigured. Thus, as used in the middle column on the drawing, the term "Manipulated Image" may or may not have been changed.

From the present description, those skilled in the art will appreciate that the derivative advertisement links can be displayed continuously or according to some predetermined or random frequency to a viewer using an online accessing device. Most typically, viewers would view a derivative advertisement utilizing a personal computer either linked directly to the Internet or linked to a network having online capabilities. The derivative advertisements and derivative advertisement links of the present invention can be displayed on any type of online accessing device. As used herein, the term "online accessing device" includes personal computers, network-based computing systems, whether actually hard-wired or remote, and any other devices previously or hereinafter developed which provide online access.

In accordance with another aspect of the present invention, a central processor counts and records the number of times that at least one, preferably a plurality and most preferably all of the derivative advertisement links are displayed on an online accessing device, i.e., the number of "hits". Those skilled in the art will appreciate that the number of times that a URL is displayed when a derivative advertisement link of the present invention is being displayed on that URL can be monitored and recorded. Additionally, the present invention includes the monitoring and recording of the number of times that a person accesses one of the derivative advertisement links, i.e., the number of click-throughs. As used herein, the term "accessed" is used to indicate that a derivative advertisement link has been clicked-through on or otherwise designated in a manner which activates the linking software thereby displaying all or a portion of the advertiser's designated website on the online accessing device.

In accordance with another preferred aspect of the present invention, a central processor or other computing device counts and records the number of times that derivative advertisement links are actually accessed from particular online accessing devices. For example, the central processor can determine the total number of times that a derivative advertisement is accessed by any online accessing devices or the number of times that such ads are accessed from different online accessing devices. In this manner, the monitoring and auditing integrity is maintained in order to give the advertiser a true representation of the success of the campaign and to discourage potential fraudulent practices wherein a particular derivative advertising link is accessed repeatedly, many times during a short time period from a single computer in order to increase the perceived number of hits or click-throughs.

Another aspect of the present invention provides methods for automatically tracking, auditing, comparing and changing online advertisements midstream, i.e., during the middle of an ad placement. For example, if a particular advertising campaign comprising different banners and therefore different derivative advertisement links had been placed to run on a particular URL of an online newspaper website during the hours of 4:00 p.m and 7:00 p.m. for the month of February, by running different ads and counting the number of times that the different ads are accessed by viewers using online accessing devices, the present invention can automatically, or with human intervention, substitute the ads which are receiving greater attention, i.e., which are being accessed more frequently. The present invention also permits an advertiser or the operator of the system to split a banner. For example, half of a banner can advertise toothpaste while the other half advertises mouthwash.

The present invention also facilitates the billing of an advertiser by a person utilizing one or more methods of the present invention. For example, a national advertiser can purchase advertising space on an online newspaper website for a particular length of time, by the number of hits the ad receives or by the number of click-throughs. For example, a soup company can purchase space on a particular URL during a particular month and during a certain time of the day, for example, between 11:00 and 11:30 a.m. Alternatively, the soup company could purchase a million hits on one or a number of URLs or 15,000 click-through from one or a plurality of URLs. It is also possible for a national advertiser to purchase advertising space according to any one of these parameters on a plurality of related or non-related web pages. For example, the soup company could purchase one million cumulative hits from 10 different URLs located in different geographical regions. In this manner, an intermediary company utilizing one or more methods of the present invention can purchase available advertising space from online newspaper websites and then sell that space to advertisers according to the same parameters in which it purchased the space from the online newspaper or on different parameters. For example, the intermediary company can purchase space from 50 different online newspaper websites at different times of the day and then resell portions of that space to many different advertisers based upon the number of hits that the advertiser's banner (derivative advertisement link) receives or some other criteria.

The block diagram shown in the figure illustrates one manner of practicing an embodiment of the present invention. According to this embodiment, the advertising agency of a national advertiser is provided with access to a system of the present invention, referred to on the drawing as the GNI system. As illustrated, more than one department of the advertising agency can have access to the system. In the illustrated embodiment, the ad buyer, the traffic department and the production/art department of the advertising agency are all given password protected access to the GNI system. In a manner which will be described later, the different departments of the advertising agency can be provided with the ability to review and request changes to the ads that they placed, through image controls.

With reference to the middle vertical column in the drawing, the advertiser can upload one or more original ads into a GNI server which checks the configuration of the ad, including the size and the number of dots per inch (dpi), and compares that configuration to specifications of online newspaper website URLs where the derivative advertisement links are going to be placed. Typically, the original advertisement must be modified thereby forming derivative advertisement links which are then preferably displayed on the computer screen of somebody such as the art director for final approval. If the reconfigured ad is approved, it is stored for placement. If the ad is not approved, the advertising agency or advertiser can create and provide a new image which is uploaded and then again compared with the specifications of the target URLs.

According to criteria which are determined by GNI in conjunction with the advertiser, GNI then forwards the plurality of derivative advertisement links to the respective newspaper online websites or their web masters for which the links have been configured and for placement on the respective websites. Thus, in accordance with this embodiment of the present invention, an original advertisement can be reconfigured to any number of derivative advertisement links for placement on any number of online newspaper websites. For example, a single original advertisement can be automatically reconfigured for placement on hundreds of online newspaper URLs in a single placement.

As indicated by the right three columns in the drawings, the GNI system periodically and/or continuously updates the specifications for online newspaper websites. The parameters which the GNI system of this embodiment of the present invention monitors are the specific URL addresses, the costs of the ad placements, the image size requirements, the computer file size requirements, the closing dates for a particular advertising placement, the locations/buys, and the auditing process that will be used to monitor and audit all aspects of the advertising campaign. Those skilled in the art will appreciate that advertisements are typically audited by independent auditors such as the Audit Bureau of Circulations, ABC Interactive or Price Waterhouse Banner Verification System. While representatives of the advertiser or advertising agency can have access to monitor all phases of the advertising campaign, according to the preferred embodiment of the present invention, the GNI system maintains control over the placements of the derivative advertisement links as well as any subsequent changes to those advertising links.

With reference to the two columns on the left side of the drawing, a statistical analysis package monitors and reports the total amount of viewer traffic that an online newspaper website receives. The present invention provides the ability to monitor the success of particular advertising campaign in real time and facilitates the modification of an advertising campaign either automatically or with user intervention. For example, an advertising campaign can start with three different original ads which are reconfigured and then placed on a wide number of websites. By monitoring the number of click-throughs on each of the ads, a more successful derivative advertisement link, i.e., one which receives a greater number of click-throughs, can be substituted for the less successful banners. The computing devices which are used to run and monitor the methods of the present invention can be automatically programmed to substitute a more successful banner for a less successful banner according to one or more pre-determined criteria, e.g., if the number of click-throughs is different by a pre-determined percentage. For example, if the derivative advertisement links from one original ad are receiving 20% more click-throughs than the derivative advertisement links created from a second original ad, then some or all of the placements of the second original ad can be automatically replaced by the more successful ad. Alternatively, other criteria and parameters used in tailoring an advertising campaign can also be adjusted during the campaign automatically or using user intervention. For example, if it is found that a soup advertisement is receiving more click-throughs in the late afternoon and ads for a financial services firm are receiving more click-throughs early in the morning, then the placement of those particular ads can be modified in order to maximize the number of click-throughs for the advertisers. The present invention provides statistics on each derivative advertisement link, each URL and can combine and provide cumulative statistics. The statistics provided preferably comprise at least the number of hits per image per online newspaper website and the number of click-throughs per image per newspaper website.

The statistical analysis package will also help the newspaper by providing new and useful information. For example, if the system determines that a particular URL is receiving more click-throughs of a type of ad, the newspaper could tailor the editorials and features of that particular web page to the audience.

As indicated by the third column from the left on the drawing, the present invention also advantageously provides accounting information including contacts at both the advertiser/advertising agency and the target newspaper websites, the costs of various advertisement placements, the number of campaigns and specific placements in progress, old jobs run for all clients along with their statistics, outstanding invoices and statements and payment histories for different clients.

The particular hardware, firmware and/or software utilized to run all or portions of the embodiments of the present invention can take many different forms and are therefore not described in detail herein.

What is claimed is:

1. A method of placing a plurality of online newspaper advertisements comprising the steps of:

loading at least one original advertisement into a computing device;

inputting configuration parameters for a plurality of different online newspaper website URLs into said computing device;

configuring at least one of said advertisements to conform with configuration parameters for a plurality of said different online newspaper websites thereby creating a plurality of derivative advertisement links from at least one of said original advertisements; and transmitting said derivative advertisements to a plurality of said different online newspaper websites for display on said websites.

2. A method of placing a plurality of online newspaper advertisements according to claim 1 further comprising the steps of counting and recording the number of times that at least one of said derivative advertisement links is displayed on online accessing devices.

3. A method of placing a plurality of online newspaper advertisements according to claim 1 further comprising the step of counting and recording the number of times that each of a plurality of said derivative advertisement links are accessed.

4. A method of placing a plurality of online newspaper advertisements according to claim 3 further comprising the step of modifying the frequency of displays of at least one of said derivative advertisement links in response to the number of times that a plurality of said derivative advertisement links are accessed.

5. A method of placing a plurality of online newspaper advertisements according to claim 1 wherein said loading step comprises loading a plurality of original advertisements into said central processor;

counting and recording the number of times that each of a plurality of said derivative advertisement links are accessed and modifying the frequency of displays of at least one of said derivative advertisement links in response to the relative frequency that said derivative advertisement links are accessed.

6. A method of placing a plurality of online newspaper advertisements according to claim 3 and further comprising the step of modifying the frequency of displays on a particular URL in response to the number of times that each of a plurality of said derivative advertisements are accessed.

7. A method of placing a plurality of online newspaper advertisements according to claim 3 further comprising the step of modifying the frequency of displays for a particular derivative advertisement during a particular time of day in response to the number of times that each of a plurality of said derivative advertisements are accessed.

8. A method of placing a plurality of online newspaper advertisements according to claim 3 further comprising the step of modifying the frequency of displays for a particular derivative advertisement link during at least one particular day of the week in response to the number of times that each of a plurality of said derivative advertisements are accessed.

9. A method of placing a plurality of online newspaper advertisements according to claim 3 further comprising the step of modifying the frequency of displays for a particular derivative advertisement link during at least one particular day of the week in response to the number of hits received at a particular website URL.

10. A method of placing a plurality of online newspaper advertisements according to claim 3 further comprising the step of modifying the frequency of displays for a particular derivative advertisement link during at least one particular day of the week toward the end of an advertising campaign.

11. A method of placing a plurality of online newspaper advertisements according to claim 2 further comprising the step of stopping the display of at least one of said derivative advertisements when said number of displays reaches a predetermined number.

12. A method of placing a plurality of online newspaper advertisements according to claim 1 further comprising the step of associating identifying information with said derivative advertisement links such that when a derivative advertisement link is accessed from a particular URL, the URL from which the derivative advertisement link was accessed can be identified.

13. A method of placing a plurality of online newspaper advertisements according to claim 1 further comprising the step of associating identifying information with said derivative advertisement links wherein when the number of times that said display has been accessed reaches a pre-determined number, the placement of the derivative advertising links is terminated.

14. A method of placing a plurality of online newspaper advertisements according to claim 1 further comprising the step of associating at least one packet of information which is downloaded onto an online accessing device and which causes said online accessing device to send a signal to a website displaying a derivative advertisement link if that website is subsequently accessed by said online accessing device with said derivative advertisement link.

15. A system for automatically configuring and placing online newspaper advertisement links comprising:

a computing device comprising means for receiving an original advertisement;

means for receiving and storing configuration criteria for a plurality of URLs from unrelated, online newspaper website advertisement spaces;

means for automatically creating derivative advertisement links which are configured for a plurality of said unrelated, online newspaper websites from said original advertisement; and means for transferring said derivative advertisement links for display on URLs of a plurality of unrelated online newspaper websites.

16. A system for automatically configuring and placing online newspaper advertisement links according to claim 15 further comprising means for counting and recording the number of hits received by each of said derivative advertisement links.

17. A system for automatically configuring and placing online newspaper advertisement links according to claim 15 comprising means for counting and recording the number of times that each derivative advertisement link is accessed by an online accessing device.

18. A system for automatically configuring and placing online newspaper advertisement links according to claim 15 further comprising means for substituting a first derivative advertisement link for a second derivative advertisement link in response to some pre-determined criteria.

19. A system for automatically configuring and placing online newspaper advertisement links according to claim 18 wherein said pre-determined criteria is the relative number of times that said first derivative advertisement link and said second derivative advertisement link are accessed by online accessing devices.

20. A system for automatically configuring and placing online newspaper advertisement links according to claim 18 wherein said pre-determined criteria is the relative number of times that said first derivative advertisement link and said second derivative advertisement link are accessed by different online accessing devices.

21. A system for automatically configuring and placing online newspaper advertisement links according to claim 15 further comprising means for inputting changes to the criteria which control the placement of derivative advertisement links.

22. A system for automatically configuring and placing online newspaper advertisement links according to claim 15 further comprising means for receiving operator input to modify the frequency of which one or more derivative advertisement links are displayed.

23. A system for automatically configuring and placing online newspaper advertisement links according to claim 15 further comprising means for receiving operator input to modify the location at which one or more derivative advertisement links are displayed.

24. A system for automatically configuring and placing online newspaper advertisement links according to claim 15 further comprising means for receiving operator input to modify the URLs on which one or more derivative advertisement links are displayed.

25. A system for automatically configuring and placing online newspaper advertisement links according to claim 15 further comprising means for receiving operator input to modify the type of URLs on which one or more derivative advertisement links are displayed.

26. A system for automatically configuring and placing online newspaper advertisement links according to claim 15 further comprising means for substituting a first derivative advertisement link for a second derivative advertisement link.

* * * * *